Sept. 19, 1944.   J. G. JACKSON   2,358,457
FOLDED BAKE PAN
Filed Aug. 14, 1940

INVENTOR.
Joseph G. Jackson
BY  Stanley Hoods
ATTORNEY.

Patented Sept. 19, 1944

2,358,457

UNITED STATES PATENT OFFICE 2,358,457

FOLDED BAKE PAN

Joseph G. Jackson, Oak Park, Ill., assignor to The Edward Katzinger Company, Chicago, Ill., a corporation of Illinois Application August 14, 1940, Serial No. 352,573

3 Claims. (Cl. 220—62)

This invention relates to improvements in the manufacture and production of bake pans formed from a single blank of sheet metal or the like in which a certain amount of fullness or excess of material generated at the corners of the pan is commonly taken care of by folding the excess material flat against a wall of the pan to create corner folds or laps of double thickness.

It is a primary object of this invention to effect a folding of such corner folds or laps in connection with the operation of squaring up the interior corners of the pan as to relieve and substantially eliminate strain on the bend between the plies of the fold and the pan walls of which they form continuations.

It is also an object of this invention to so dispose a portion of the bend between the innermost ply of a corner fold and the pan wall of which it forms a continuation outwardly beyond a plane common to the inner surface of the pan wall of which the outermost ply of said fold forms a continuation, whereby the latter pan wall is adapted to lock the first pan wall against inward angular displacement.

It is a further object of this invention to so construct a folded pan that the same will have added stiffness and rigidity, particularly at the corners thereof.

With the above and other objects in view, as will be apparent, this invention consists in the construction, combination and arrangement of parts, all as hereinafter more fully described, claimed and illustrated in the accompanying drawing, wherein:

In the folding of the corner laps on folded type bake pans, as heretofore practiced, the bend between the plies of the corner lap and the pan walls of which they form continuations were subjected to such flattening during the corner squaring operation as to weaken the metal and frequently fracture the metal, particularly at the bend between the innermost ply and the pan wall of which it formed a continuation.

In the present invention the bend between the lap plies and the pan walls is so relieved during the fold flattening operation and corner squaring step as to permit a slight radius in the bend between the innermost ply and the pan wall of which it forms a continuation.

Figure 1:
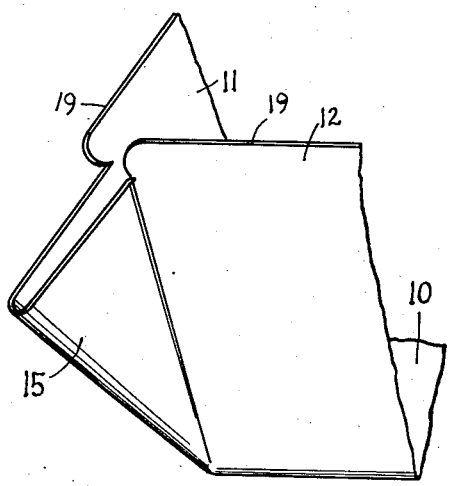
Fig. 1 represents a corner of a bake pan after the first step of forming the pan has been completed.
Figure 2:
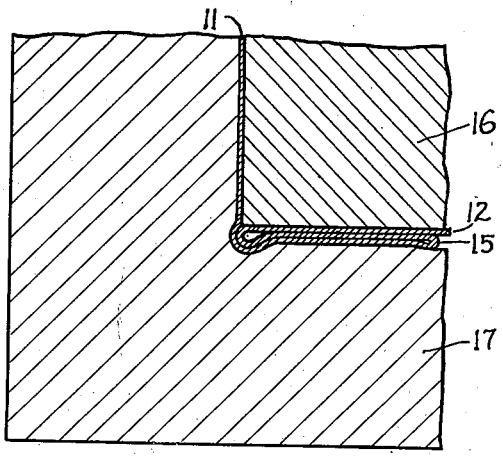
Fig. 2 is a view in section, illustrating the method of folding the corner folds flatly against a wall of the pan in connection with the operation of squaring up the interior corner of the pan.
Figure 3:
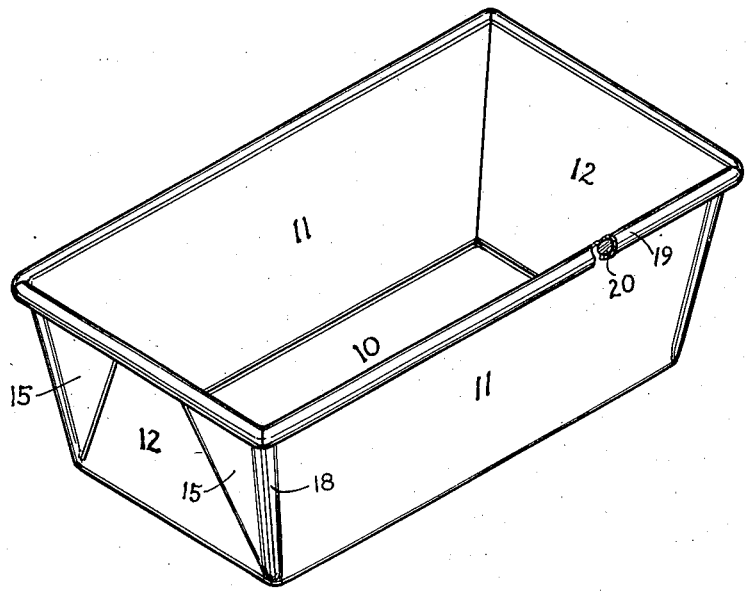
Fig. 3 is a view in perspective of the completed pan.

Reference being had more particularly to the drawing, 10 designates the bottom of a pan, 11 its side walls and 12 its end walls, all formed by folding and bending a single metallic sheet. When the walls 11 and 12 are folded or bent to the positions they occupy as shown in Fig. 1, there are double thicknesses of sheet metal developed at the four corners of the pan which are arranged in a manner to form the generally triangular corner laps or folds 15. Subsequent to the operation of initially bending the walls 11 and 12 into the position shown in Fig. 1, the pan blank is arranged over the corner of a rectangular mandrel 16 with the outer corner of the pan blank in position to be operated upon by a die 17. The die 17, it will be observed, is provided with a curved pocket whereby pressure on the pan blank corner between the die 17 and mandrel 16 not only bends the corner lap or fold 15 flatly against the wall 12 of the pan but permits displacement of the bend between the plies of the lap 15 and the pan walls to form a rib-like protrusion 18 on the outside of the corner. In this manner, the bend between the innermost ply of the lap 15 and the pan wall 12 becomes arranged in the form of a loop protruding beyond a plane through the lateral limits of the inner surface of the pan wall 11 and of sufficient radius to prevent complete flattening or weakening of the bend. It will also be apparent that the bend between the outermost ply of the lap 15 and the pan wall 11 of which it forms a continuation assumes the shape of an outwardly extending rib protruding beyond the normal outer limits of the pan walls 11 and 12 adjacent the corner of the pan, with the looped bend between the innermost ply of the lap and the pan wall 12 having a configuration corresponding to the inner surface of and nested within said rib 18. As a result, the edge of the pan wall 12 defined by the bend between itself and the innermost ply of the lap is locked behind the juncture between the pan wall 11 and the rib 18 defined by the bend between the outermost ply of the lap and said wall 11, whereby inward angular displacement of the pan wall 12 is effectively obstructed.

Due to the formation of the rib 18, the corners of the pan are substantially strengthened and stiffened whereby the life of the resulting pan is prolonged.

At the upper or top edges of the walls 11 and 12 are flanges 19 which may be bent outwardly, downwardly and inwardly to be wrapped about a wire frame 20 positioned against the outer surfaces of the walls 11 and 12 adjoining the flanges 19, whereby an outstanding reinforcing bead is created at the upper edge of each pan wall.

Having thus described this invention, what is claimed is:

1. A one-piece sheet metal bake pan having upstanding angular walls with excess of material at the corners arranged in two-ply folds adjacent certain of the pan walls, the bend between the innermost ply of a fold and the pan wall of which it forms a continuation being arranged in a loop protruding beyond a plane common to the inner surface of the pan wall of which the outermost ply of said fold forms a continuation.

2. A one-piece sheet metal bake pan having upstanding angular walls with excess of material at the corners arranged in two-ply folds adjacent certain of the pan walls, the bend between the outermost ply of a fold and the pan wall of which it forms a continuation being arranged in an outwardly extending rib protruding beyond the normal outer limits of said pan wall and said fold, and the innermost ply of said fold and the pan wall of which it forms a continuation being arranged in a loop nested within said rib.

3. A one piece sheet metal bake pan having a bottom surrounded by upstanding angular side walls meeting in upstanding straight lines defining the lateral limits of the inner surfaces of said side walls with excess of material generated at each of said meeting lines being arranged to provide a compact two-ply fold disposed against the outer surface of one of the pan walls of which said material forms a continuation, the bend between the innermost ply of said fold and the pan wall of which it forms a continuation being arranged in a loop protruding beyond a plane through the lateral limits of the inner surface of the wall of which the outermost ply of said fold forms a continuation.

JOSEPH G. JACKSON.